United States Patent [19]

Smith et al.

[11] 4,330,197
[45] May 18, 1982

[54] RECIRCULATING DOCUMENTS DUPLEX COPIER

[75] Inventors: Richard E. Smith, Webster; John R. Yonovich, Shortsville, both of N.Y.

[73] Assignee: Xerox Corporation, Stamford, Conn.

[21] Appl. No.: 172,807

[22] Filed: Jul. 28, 1980

Related U.S. Application Data

[63] Continuation of Ser. No. 57,855, Jul. 16, 1979, abandoned.

[51] Int. Cl.³ ............................................. G03G 15/00
[52] U.S. Cl. ................................ 355/14 SH; 271/3.1; 355/3 SH; 355/23; 355/26
[58] Field of Search ................. 355/14 SH, 3 SH, 23, 355/24, 26, 77; 271/3, 3.1, 4

[56] References Cited

U.S. PATENT DOCUMENTS

| | | | |
|---|---|---|---|
| 3,588,472 | 6/1971 | Glaster et al. | 235/92 |
| 3,937,454 | 2/1976 | Colwill | 271/6 |
| 4,076,408 | 2/1978 | Reid et al. | 355/14 |
| 4,098,551 | 7/1978 | Komori et al. | 355/3 R |
| 4,099,150 | 7/1978 | Connin | 355/23 X |
| 4,116,558 | 9/1978 | Adamek et al. | 355/8 X |
| 4,125,325 | 11/1978 | Batchelor et al. | 355/14 SH |
| 4,140,387 | 2/1979 | Gustafson | 271/3.1 X |
| 4,158,500 | 6/1979 | DiFrancesco et al. | 355/14 SH |
| 4,162,844 | 7/1979 | Traister et al. | |
| 4,166,614 | 9/1979 | Hamlin et al. | 271/3.1 |

FOREIGN PATENT DOCUMENTS

| | | | |
|---|---|---|---|
| 279353 | 3/1970 | Austria. | |
| 2000749 | 1/1979 | United Kingdom | 355/3 SH |

*Primary Examiner*—R. L. Moses

[57] ABSTRACT

An automatic pre-collation duplex copier in which original documents having either an odd or even number of pages may be recirculatively copied in reverse serial order yet provide properly collated output duplex copy sets. A simplex/duplex copying system is disclosed in which, when an odd number of document sheets are detected in a first, non-copying, circulation of the document sheets, the copying of the last and subsequent alternate document sheets is inhibited during the first copying circulation, whereas if an even number of document sheets are detected, the copying of the second and subsequent alternate document sheets is inhibited during this first copying circulation, and these different copying sequences are reversed for the last copying circulation. All document sheets are copied during the intermediate circulations. A compatible duplex/duplex copying system is also disclosed.

12 Claims, 1 Drawing Figure

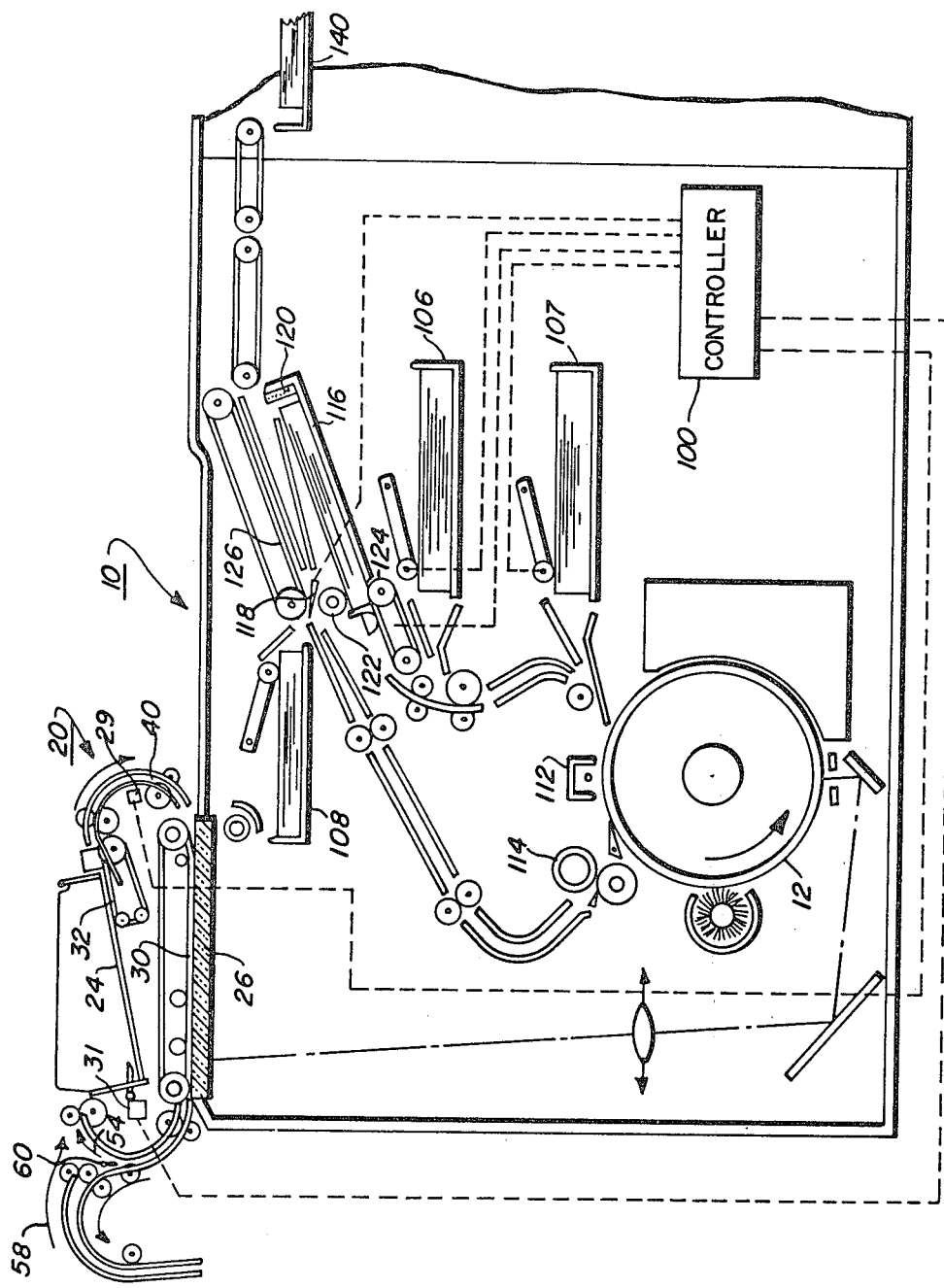

RECIRCULATING DOCUMENTS DUPLEX COPIER

This is a continuation of application Ser. No. 57,855, filed July 16, 1979, now abandoned.

The present invention relates to an improved automatic document handling system for providing pre-collation duplex copying.

As xerographic and other copiers increase in speed, and become more automatic, it is increasingly important to provide higher speed yet more reliable and more automatic handling of both the copy sheets and the individual original documents being copied. The providing of duplex copying capabilities and pre-collation copying capabilities greatly complicates and increases the copier document and copy sheet handling complexities.

The term "duplex copying" may be more specifically defined into several different, individually known, copying modes. In duplex/duplex copying, both sides of a duplex document sheet (which has images on both sides) are copied onto both sides of a single copy sheet. In duplex/simplex copying, both sides of a duplex document are copied onto only one side of two successive copy sheets. In simplex/duplex copying, to which the present invention particularly relates, the images of two successive simplex document sheets, which have images on only one side, are copied onto opposite sides of a single copy sheet. In the printing industry, as opposed to the copier industry, two-sided copying may be referred to as "backing-up" rather than duplex copying.

In a set of duplex documents or copy sheets, odd pages 1, 3, 5, etc., will typically appear on the first sides, with even pages 2, 4, 6, etc., on the second sides, respectively. If there are an odd number of pages in the set of duplex sheets the backside of the last sheet will typically be blank (empty). In contrast, in a set of simplex document or copy sheets, the number of the sheet will typically also correspond to the page number. Thus, an odd number of simplex document sheets will normally have an odd number of page images.

The duplex copying of the copy sheets (for either duplex/duplex or simplex/duplex copying) may be done by first making in the copier processor a set of simplexed copy sheets (printed only on their first sides) of only the odd or the even document pages and temporarily storing those simplex copy sheets in a duplex buffer tray, and then feeding them back through the same copying processor for a second pass printing of the opposite order (even or odd page) document images on the opposite sides of the copy sheets. Such systems may be referred to as sequential or dual pass duplexing systems. Examples of such systems for handling the copy sheets being duplexed are shown in U.S. Pat. Nos. 3,615,129, issued Oct. 26, 1971 to W. A. Drawe, et al.; 3,645,615, issued Feb. 29, 1972, to M. R. Spear, Jr.; and 3,851,754, issued Oct. 15, 1974, to E. E. Drexler et al. on duplex/duplex. Of particular interest as disclosing a duplex copying system which is also a pre-collation copying system are U.S. Pat. Nos. 3,630,607, issued Dec. 28, 1971, to H. Korn and 4,116,558, issued Sept. 26, 1978, by the same assignee in the name of J. A. Adamek et al.

The present invention is an improvement over said Adamek U.S. Pat. No. 4,116,558 for automatically achieving copying and storage of even page numbered copies of simplex documents in the duplex buffer tray to avoid variable output inversion or copying of a blank page when an odd number of simplex documents are being duplex copied, as indicated in that patent to be desirable, and for achieving this feature under the further difficulty of copying the documents in reverse (decending) serial page order with a different type of document handling system. The description beginning with the last paragraph of Column 8 of said Adamek U.S. patent is particularly noted by way of background for this application.

A desirable feature for a copier is to provide automatic document recirculation for pre-collation copying. As discussed, for example, in detail in U.S. Pat. No. 3,963,345, issued June 15, 1976, to D. J. Stemmle, et al., at Columns 1–4, and the above-cited Adamek patent, such pre-collation copying systems provide a number of important advantages. The copies exit the copier in pre-collated sets, and do not require subsequent sorting in a sorter or collator. Any desired number of such copy sets may be made by making a corresponding number of recirculations of the document set in collated order past a copying station and copying each document once each time it recirculates. On-line finishing and/or removal of the completed copy sets may be provided while additional copy sets are being made from the same document set.

However, a disadvantage of pre-collation copying systems is that the documents must all be repeatedly circulated, and copied in a pre-determined order only once in each circulation, by a number of circulations equivalent to the desired number of copy sets. Thus, it may be seen that increased document handling is necessitated for a pre-collation copying system, as compared to a conventional post-collation copying system. Maximizing document handling automation and copying cycle efficiency is particularly important in pre-collation copying. If the document handler cannot circulate and copy documents in coordination with the copy sheets in the correct order, the total copying time for each copy set will be increased.

In a post-collation copying system, all the desired copies are made at one time from each document page and collated by being placed in separate sorter bins. The document set need only be circulated once and multiply copied to fill bins of the copy sheet sorter or collator with the corresponding number of copy sets desired. However, the number of copy sets which can be made in one circulation is limited by the number of available bins, and the sorter adds space and complexity and is not well suited for on-line finishing.

Some examples of art relating to pre-collation document handling systems of the type disclosed herein, in which each document sheet is withdrawn from the bottom of a document set stack for copying once in each circulation and then returned to the top of the document stack for repeated copying circulations include: German Patentschrift No. 1,128,295, Oct. 25, 1962; and U.S. Pat. Nos. Re. 27,976, (originally 3,499,710, issued Mar. 10, 1970) to L. W. Sahley; 3,536,320, issued Oct. 27, 1970, to D. R. Derby; 3,552,739, issued Jan. 5, 1971, to R. R. Roberts, et al.; 3,556,511, issued Jan. 19, 1971, to A. Howard, et al.; 3,888,579, issued June 10, 1975, to V. Rodek et al.; and 3,937,454, issued Feb. 10, 1976, to R. H. Colwill. A recent example of a pre-collation copying system of this type, with circuitry and switches for counting the number of documents recirculated and for counting the completion of each set circulation, and face-up loading of the document stack, is shown in U.S. Pat. No. 4,076,408, issued Feb. 28, 1978, to M. G. Reid et al., and in the U.S. Patent Office Defensive Publication No. T957,006 of Apr. 5, 1977, based on application Ser. No. 671,865, also filed Mar. 30, 1976, by M. G. Reid, et al. Other examples of document sheet sensors are disclosed in U.S. Pat. No. 3,790,158, issued Feb. 5, 1974, to J. E. Summers et al.

A recent example of an N to 1 order duplex or simplex pre-collation copying document recirculation system is disclosed in article No. 16332, pp. 49–52 of the November 1977 issue of "Research Disclosure", published by Industrial Opportunities, Ltd., Homewell, Havant, Hampshire, U. K. A corresponding U.S. application Ser. No. 813,041, was filed July 5, 1977 and its equivalent U. K. application No. 2,000,749A was published Jan. 17, 1979.

Further examples of copier systems with document and sheet handling control systems are described in U.S. Pat. Nos. 4,062,061, issued Dec. 6, 1977, to P. J. Batchelor et al.; 4,078,787, issued Mar. 14, 1978, to L. E. Burlew et al.; 4,099,150, issued July 4, 1978, to J. L. Conin; 4,123,155, issued Oct. 31, 1978, to W. L. Hubert; 4,125,325, issued Nov. 14, 1978, to P. J. Batchelor et al.; and 4,144,550, issued Mar. 13, 1979, to J. M. Donohue et al.

While conventional integral software incorporation into the copier's general microprocessor logic circuitry and software of the functions and logic defined herein as taught by the above is preferred, it will be appreciated that the functions and systems disclosed herein may be alternatively conventionally incorporated into a copier utilizing any other suitable or known copier software or hard wired logic systems, cam-bank switch controllers, etc. The output control of the exemplarly sheet handling systems disclosed herein may be accomplished by activating known electrical solenoid controlled sheet deflector fingers and drive motors or their clutches in the indicated sequences, and conventional sheet path sensors orswitches may be utilized for counting and keeping track of the positions of documents and copy sheets.

Certain aspects of the duplex copying exemplary system here are disclosed in an allowed U.S. application Ser. No. 825,743, filed Aug. 18, 1977, and published Mar. 1, 1979, as German OLS No. 2,828,669, and in a related U.S. Pat. No. 4,166,614 issued Sept. 4, 1979 filed on the same date.

All of the patents cited herein for background or art purposes are also incorporated by reference herein to the extent they provide teachings of usable or alternative systems or hardware for the disclosed embodiments herein.

A preferred feature of the invention is to provide, in a document handling apparatus for plurally recirculating a set of simplex original document sheets to a copier to be copied onto both sides of copy sheets to form pre-collated duplex copy sets, an improvement comprising; means for circulating and copying the documents in reverse (decending) serial page order beginning with the last sheet in the document set and ending with the first sheet in the document set, odd/even determining means for automatically determining whether there are an odd or an even number of original documents in said document set before they are copied; and copying control means, controlled by said odd/even determining means, to inhibit copying of the last and alternate subsequent documents on the first copying circulation of said document set in response to a determination by said odd/even determining means that there are an odd number of original documents in said set, and to inhibit copying of the next-to-last and alternate subsequent documents on the first copying circulation of said document set in response to a determination by said odd/even determining means that there are an even number of said original documents.

It is a further preferred feature of the invention to place a set of simplex original document sheets in a collated face-up stack of 1 to N page order which are individually circulated from the bottom of the stack to the platen of a copier and back to the top of said stack in N to 1 order, with N being the page number of the bottom page of said document stack, wherein said odd/even determining means determines whether N is an odd or even page number, and wherein if N is an odd number, the document sheets are copied in the first copying circulation as controlled by said copying control means in the copying order sequence N minus 1, N minus 3, N minus 5, etc., up to the total number of document sheets in said document set, and in at least the second copying circulation all the document pages are copied and the Nth document page is first copied on only one side of a copy sheet as a simplex copy, and in the last copying circulation that same document set is copied in the copying sequence N, N minus 2, N minus 4, etc., and wherein if N is an even number, the documents are copied in the first copying circulation in the order N, N minus 2, N minus 4, etc., and copied on the last copying circulation in the order N minus 1, N minus 3, N minus 5, etc.

Preferably said odd/even determining means comprises means to circulate the document set once before it is copied and count the number of sheets in that non-copying circulation.

Further features and advantages of the invention will be better understood by reference to the following description, and to the drawing forming a part thereof, wherein:

The FIGURE is a partial side view of an exemplary copier and a document feeder therefor incorporating the present invention.

Referring to the exemplary copier 10 shown in the FIGURE, and its exemplary automatic document feeding unit 20, it will be appreciated that various other recirculating document feeding units and copiers may be utilized with the present invention, including various ones disclosed in the above-cited references.

In the recirculating document handler (RDH) 20 here, individual original documents are sequentially fed from the bottom of a stack of documents (placed by the operator face-up in the document storage area or stacking tray 24) to the imaging station 26, which is the conventional platen of the copier 10, to be conventionally imaged onto a photoreceptor 12 for the making of copies in a conventional xerographic manner. The document handler 20 has conventional switches such as 29 for sensing and counting the individual documents fed from the tray 24, i.e., counting the number of document sheets circulated. A conventional resettable bail and its associated switch 31 indicates the completion of each circulation of the complete document set and then is automatically reset on the top of the stack before the next circulation. The document feeder 20 is selected or adapted to serially sequentially feed the documents, which may be conventional sizes and weights of sheets of paper or plastic containing information indicia to be copied, e.g., printed or typed letters, drawings, prints, photographs, etc. A bottom feeder 32 feeds the bottom document sheet, on demand, to a platen belt 30 which moves the document into registration over the copier platen. In this document feeder 20 each document is inverted as it is fed from the tray 24 to the imaging station 26 around a first inverting path 40.

After the document has thus been turned over once at 40 and copied, there is a decision gate 60 in the document path after the downstream end of the platen belt 30 here, comprising pivotable deflector fingers, which determines the further recirculatory movement of the documents through a selected one of two different return transport paths back to the tray 24. These two paths are a first (simplex) transport path 54 and a second (duplex) transport path 58. The second or duplex transport path 58 returns the documents to their storage area 24 for restacking with effectively only a single inversion. In contrast, the first or simplex transport path 54 transports the documents around a second inverting path 54 and returns them to the same restacking tray after having been inverted twice. Therefore, the solenoid or other actuation of the selector gate 60 determines whether the documents are recirculated with a total of one or two inversions. With two inversions (the simplex path 54) the same sides of the documents are exposed in each circulation and are restacked in the tray 24 in each circulation in their original orientation. With one inversion (the duplex path 58) the documents are restacked in the tray 24 inverted from their previous orientation, which provides for copying of the opposite sides or faces of the documents on their next circulation. This is only used for copying duplex documents. The exemplary duplex path transport 58 here is provided by a reversable three roller sheet inverter as shown.

Both the simplex transport 54 and duplex transport 58 continuously restack the sheets after they are copied on the top of the stack of sheets in the tray 24. Thus, continuous multiple recirculations for pre-collation copying can be provided.

The exemplary copier 10 processor and its controller 100 will be described in further detail. It provides duplex or simplex pre-collated copy sets from either duplex or simplex original documents copied by the RDH 20. Two separate copy sheet trays 106 and 107 are provided here to feed clean copy sheets onto which the images of the documents are to be printed. The control of sheet feeding is by the machine controller 100. The controller 100 is preferably of the known programmable microprocessor type exemplified by the patents cited in the introduction, which conventionally also controls all of the other machine functions described herein including the operation of the document feeder, the document and copy sheet gates, feeder drives, etc.

For pre-printed or blank covers or other non-copy inserts additional inserter trays such as 108 can be provided, if desired, for direct output without printing, but interleaved with the copies.

The copy sheets are fed from trays 106 or 107 to the conventional xerographic transfer station 112 for imaging one side thereof, then to the conventional fusing station 114. From there, depending on the position of a duplex selector finger or gate 118, the copy sheets will be deflected either into a duplex buffer intermediate storage tray 116 for duplex copies, or into the copy output path of the copier via an output transport 126. The copy sheets stacked into the duplex tray 116 are stacked image face-up in the order in which they were copied. The duplex tray 116 here includes a bounce reverser 120 and jogger/normal force wheels 122 for assisting the stacking of copy sheets therein and assistance in bottom feeding from the duplex tray 116 by a bottom feeder 124. For duplex copying the previously simplexed copy sheets in the tray 116 are fed by the feeder 124 back to the transfer station 112 for the imaging of their second or opposite side page image. Such now-duplexed copy sheets are then fed out past the now-opened gate 118 into the same output transport 126. The output transport 126 transports the finished copy sheets to an output tray, or, preferably, to a finishing station 140 for the stapling, stitching, gluing, binding, and/or off-set stacking of the completed, pre-collated, copy sets. The copy sheet may be stacked in the finisher in a compilier tray in the order produced without an inverter with the system disclosed here.

By way of further background, a known problem with reproducing machines which must do both simplexing and duplexing is the maintaining of proper collation of the copy sheets in the output tray. For example, for simplex copy sheets generated in reverse serial order, the copy sheets would be properly collated if they are output stacked in that order (N to 1), and stacked face-up in the output tray. Thus, when the operator picks up the stacked set of completed copy sheets, it will be in the proper forward serial page order (1 to N) from the top of the stack to the bottom. The same is true for duplex copies, with the additional requirement that a lower document page number be on the top of the copy sheet and the next higher document page number be on the bottom of the same copy sheet, so that the completed duplex copy set is in the order 1/2; 3/4; 5/6; etc. A difficulty is that most dual pass duplex copying systems inherently have an inversion of a duplex copy sheet within the processor as the duplex copy sheet is returned to the transfer station from the duplex tray for the printing of the second side image onto the back of the duplex copy sheet. Thus, typically a duplexed copy sheet receives one more inversion than a simplexed copy sheet. Accordingly, the output path for a simplex copy sheets is typically different (i.e., contains one more or one less inversions) than the output path for duplex copy sheets in order to maintain the proper collation order of the output sheets.

It is known that this creates a particular problem when there is an odd number of document pages to be copied onto a duplex copy set. In that case, the last page of the set of duplexed copies is really a simplex copy, because with an odd number of original document pages the last copy sheet page in the copy set will only have an image on one side thereof, and the other side will be blank. It is known from the above-cited Adamak patent, for example, to be undesirable to run this last duplex copy sheet page through the transfer station for the pseudo-printing of a blank image on the backside thereof in order to obtain an additional inversion, since this wastes processing time and also can cause undesirable background contamination of the blank backside of this last page sheet. This can be avoided by printing a last (odd) page of the duplex copy set on only one side of a clean copy sheet fed from a copy sheet tray, rather than from the duplex buffer tray, i.e., only running this particular copy sheet through the processor once. However, this results in the last duplex copy sheet having a different number of inversions, and, therefore, apparently requiring its inversion in order to maintain its collation with the rest of the duplex copy sheets if copied in forward serial order. This inversion adds an additional time delay and potential paper jam site, as well as the additional expense of the inverter mechanism. Further, in order to treat the last duplex page differently, it is necessary to know whether an odd or even page number document is being copied. That is easy to know if the documents are copied from page 1, in forward serial order, but not if the first document copied is the last sheet of an unknown number of documents.

With the present system, these problems are overcome, and the last odd page of the duplex document set can be copied on only one side of a clean sheet fed from a copy sheet tray and fed out to the copier output without an additional inverter being required.

Assume, as one example here, a five page (five sheet) simplex document set, from which 10 pre-collated copy sets are desired. This is accomplished here with 12 document set circulations.

A first non-copying circulation of this document set determines with a count of the sheet sensor switch 29 in conjunction with bail switch 31 whether there are an odd or even number of documents. Determining that the number of document pages is odd in this example, i.e., that the last document N is 5, the copier controller 100 in the next (second) circulation of the document set skips the first and subsequent alternate documents and copies only the even pages 4 and 2, in that order [i.e., copies only pages N minus 1 and N minus 3] and places those even page copy sheets in the duplex buffer tray 116. The other document sheets are circulated in this first copying circulation, but their copying is inhibited and no corresponding copy sheet is fed for them in this first copying circulation.

On the next 9 document circulations in this 10 set example (intermediate circulations 3 to 11) all the documents are copied in the N to 1 order, i.e., 5, 4, 3, 2, 1. However, the copy sheets for page 5 is fed from the copy sheet tray 107 or 106 (not the duplex buffer tray 116) and after receiving page 5 on only one side thereof is directly outputted, as a simplex copy. Page 5 is thus face-up in the output to the finisher 140, and the first copy sheet out. Document page 4 is then copied on a sheet fed from the copy tray 107 or 106 and fed into the duplex buffer tray 116. The next copy sheet is fed from the bottom of the duplex tray 116. This is the copy sheet on which page 4 had been printed in the previous circulation. Document page 3 is printed on its opposite face, and, due to the inherent inversion in the processor output path, this second copy sheet out is placed in the output path with its page 3 side face-up and its page 4 side face-down on top of the preceeding page 5 copy sheet. The next even document page, page 2, is also copied on a clean copy sheet from tray 106 or 107 and fed into the duplex tray 116 on top of the preceeding page 4. The last copy sheet in each set is fed from the duplex tray 116 and it receives the document page 1 image on the opposite side of the previous page 2 image and is likewise outputted. Thus, in each of these 9 document circulations a complete duplexed outputted copy set is provided stacked in the finisher 140 in the proper collated order 1/2; 3/4; 5/blank; and meanwhile the duplex tray 116 has been refilled with another even-side buffer set.

On the last (12th) document set circulation in this example the above copying sequence is changed in that none of the even document pages, 2 and 4 in this example, are copied. Thus, the duplex buffer tray 116 is emptied out, and not refilled, on the last copying circulation, and the final (10th) copy set is provided, as taught by the above-cited Adamak patent.

If, in the above example, there had been an even number of documents, e.g. 4, the copier controller would change the copying sequence and not skip the first and subsequent alternate documents being recirculated in the first copying circulation. Rather, it would skip pages 3 and 1, the second and alternate documents, to copy only the even pages 2 and 4 in the first circulation. On the second copying circulation it would feed the first copy sheet (page 4) to the duplex tray, not to the output, since it is an even page to be duplexed, as described above.

If, in the above example, there had been only one copy set requested (punched into the copy count selector switch) rather than 10, then only the first and second and last document circulations described above would be utilized. There would be no intermediate circulations in which all documents were copied.

It may be seen that by the combination here of reverse document page order copying but with automatic feeding of only even page copies into the duplex tray, and the feeding of those even page copies back to the processor in the order in which they were copied on their first sides, that proper output collation is maintained even though the last odd document page copy is effectively simplexed. To express it another way, with this system, no separate or additional inverter is required for effectively simplexing the last duplex copy sheet when there is an odd number of document pages. Further, this same document handler and copier can be alternatively utilized to produce fully simplexed copy sets from the same simplex documents if desired, and these simplex copy sheets will also be in the proper collated output order, i.e., output stacked in N to 1 order, but face-up, so as to form proper 1 to N page order copy sets.

It is important to note that with this system, that the odd image page number which is placed on the second side of the copy sheet being duplexed is the preceeding (lower) page number, not the succeeding (higher) page number. That is, page 3 is printed on the backside of page 4 and not page 5. This is essential for maintaining proper collation here, where the copy sheet is outputted with the last printed side up. This would be true of a straight-through paper path bottom transfer copier as well as the disclosed top transfer copier with one inversion in the output path from the transfer station to the finisher. The present system automatically accomplishes, with this particular reverse serial order copying system, the placement of the next lower odd page number on the back of each copy sheet bearing the immediately previous higher even page number.

It is also important to note that the present system properly and consistently handles letterhead or other pre-printed or pre-punched copy sheet stock or forms for duplex copying for either an odd or even number of duplex or an even number of simplex originals. In printing onto letterhead paper, page one, the odd page, must be printed on the front or letterhead side, not the back side, of the copy sheet. For pre-punched sheets the binder holes must be on the left side of the odd pages. With the present system these restricted copy sheets can desirably always be placed face-up in either of the copy sheet trays, yet will always be properly duplexed, since the proper even page sides are always printed on the back of the copy sheets first as they are fed from the copy trays, and then the odd document pages are copied onto the front sides of the copy sheets as they are fed from the duplex tray.

Briefly re-describing the disclosed simplex/duplex copying system, it will be seen that it does not require a separate or variable copy output sheet inverter yet provides proper page order collated output of all copies, even for those copiers like the "Xerox" "4000" or "5400" which have an inherent inversion in the paper path output after transfer (rather than a straight-through paper path). Such a paper path is disclosed here. There is no feeding of a "blank" side copy sheet through the processor for the back of a last odd copy page, or its inversion. The documents are always circulated in N to 1 order (i.e., reverse serial page order) in all circulations. For this purpose, the simplex document set here is placed face-up in the tray of a document handler which bottom-feeds the documents to the platen. Before copying is initiated, the document set is first initially circulated in one non-copying circulation during which the number of documents is counted. If an even number of simplex documents is counted on this first "pre-count" circulation, then on the second (and first copying) circulation the documents are copied in the order N, N minus 2, N minus 4, N minus 6, etc. That is, when the "pre-count" circulation determines that the last document is an even document, then all even documents (only) are copied in the second document circulation by copying every other document in reverse order starting with the very last document N. The odd document pages are circulated, but not copied. In contrast, if an odd number of documents is counted in the pre-count cycle, then the last sheet N of the document set and the alternate subsequent documents are not copied on the second circulation and the copying sequence is N minus 1, N minus 3, N minus 5, N minus 7, etc. This also causes only even document pages to be copied in the second (first copying) circulation even though the last document page is odd rather than even. Thus, an even side buffer set is always placed in the duplex tray for either odd or even numbers of documents. After the above-described first two document circulations, all but the last subsequent circulations proceed with copying of all document pages onto copy sheets fed alternately from the copy tray and duplex tray, as disclosed in Xerox U.S. Pat. No. 4,116,558. Then on the last document set circulation, only the odd document pages are copied, by reversing the copying sequence for odd and even numbers of documents which was described above for the second circulation.

Referring now to the duplex/duplex system which can be compatibly provided here, the duplex documents may also be loaded face-up and copied in the same N to 1 (reversed serial) order from the same single document tray. Here the document inverter for the duplex documents is downstream of the platen rather than upstream. Thus, the duplex documents are also first run through a single dummy (non-copying) circulation, but with inversion to restack the documents inverted in the DH tray from their initial orientation. Thus, the even sides of the duplex documents are copied on the second (first copying) circulation and placed in the duplex tray so that the proper page order sequence can be provided in the output of the duplex copy sheets without an inverter. On all subsequent circulations (up to the final one) every duplex document sheet is copied on one side and then inverted before restacking as described in the above-cited U.S. application Ser. No. 825,743 and U.S. Pat. No. 4,166,614 (but in reverse serial order). That is, all the odd sides are copied on the third (second copying) circulation onto the opposite sides of the buffer set fed from the duplex tray, then all the even sides are copied in the fourth circulation and placed in the duplex tray, etc., etc. The duplex documents are inverted during all but the last circulation. On the last duplex document copying pass the documents are all copied but are not inverted. Therefore, they are automatically recollated in the document handler tray during this last copying circulation.

To improve copy efficiency, an additional feature may be provided if there are only two simplex documents in the document set. With only two simplex documents, there is only one copy sheet in each duplex copy set, so collation is not required. If only two document sheets are counted in the document set during the non-copying first circulation, the copying control 100 causes the copier 10 to make multiple rather than single copies of these first and second document sheets in the first copying circulation. That is, the copier automatically switches to a non-precollation duplex copying mode in which the selected number of copies, (but limited to the duplex tray 116 capacity) is made from each document while it is held on the platen without circulation, and all these copy sheets are stored into the duplex tray and then the next document is multiply copied onto their opposite sides. If the number of "copy counter" selected copies exceeds the duplex tray capacity, the two documents are re-circulated for copying, e.g., for 60 duplex copies of two documents with a 25 sheet capacity duplex tray, 25 copies are made in the first circulation, 25 in the second and ten in the third.

While the duplex copying system disclosed herein is preferred, it will be appreciated that various variations, alternatives or improvements thereon may be made by those skilled in the art, and the following claims are intended to encompass those falling within the true spirit and scope of the invention.

What is claimed is:

1. In a document handling apparatus for plurally recirculating a set of simplex original document sheets to a copier to be copied onto both sides of copy sheets to form pre-collated duplex copy sets, the improvement comprising:
    means for circulating the documents in reverse (descending) serial page order beginning with the last sheet in the document set and ending with the first sheet in the document set,
    odd/even determining means for automatically determining whether there are an odd or an even number of original documents in said document set before they are copied, and
    copying control means, controlled by said odd/even determining means, to inhibit copying of the last, or next to last, and alternate subsequent documents on the first copying circulation of said document set in response to a determination by said odd/even determining means whether there are an odd or even number of original documents in said set, to provide properly collated output duplex copy sets without variable output inversion.

2. The document handling apparatus of claim 1, wherein in response to the determination by said odd/even determining means that there is an odd number of original document sheets, said copying control means causes the single copying of only the next-to-last and subsequent alternate document sheets on the first copying circulation of said document set, and causes the single copying of only the last and alternate subsequent document sheets on the last copying circulation of said document set, and causes the copying of all said document sheets on all copying circulations of said document set between said first and last circulations thereof.

3. The document handling apparatus of claim 1, wherein said set of original document sheets is a collated face-up stack of 1 to N page order simplex documents which are individually circulated from the bottom of said stack to the platen of said copier and back to the top of said stack in N to 1 order, with N being the page number of the bottom page of said document stack; and wherein said odd/even determining means determines whether N is an odd or even page number, and wherein if N is determined to be an odd number, the document sheets are copied in the first copying circulation as controlled by said copying control means in the copying order sequence N minus 1, N minus 3, N minus 5, etc., up to the total number of document sheets in said document set, and in at least the second copying circulation all the document pages are copied and the Nth document page is first copied on only one side of a copy sheet as a simplex copy, and in the last copying circulation the document sheets are copied in the copying sequence N, N minus 2, N minus 4, etc., and wherein if N is determined to be an even number, the documents are copied in the first copying circulation in the order N, N minus 2, N minus 4, etc., and copied on the last copying circulation in the order N minus 1, N minus 3, N minus 5, etc.

4. The document handling apparatus of claims 1, 2 or 3, wherein said copying control means includes duplex buffer means for temporarily storing the copy sheets made of the alternately copied document sheets in said first copying circulation of said document set and for re-presenting all of said temporarily stored copy sheets for the copying of images of alternate document sheets on the opposite sides of all of said stored copy sheets during the subsequent circulation of said document set.

5. The document handling apparatus of claims 1, 2 or 3, wherein when said odd/even determining means determines that there are an odd number of original documents in said document set, the first copy made in at least the second copying circulation is made from the last document page in the document set onto only one side of a blank copy sheet as a simplex copy sheet.

6. The document handling apparatus of claims 1, 2 or 3, wherein said odd/even determining means comprises means for circulating the document set in a first single non-copying circulation before any of the documents are copied and counting the number of document sheets which are circulated in said first, non-copying circulation.

7. The document handling apparatus of claims 1, 2 or 3, wherein all of said copies made from said document set have the correct number of copy sheet inversions in their output whether there are an odd or even number of said original documents without an output inverter.

8. The document handling apparatus of claim 6, wherein if only two document sheets are counted in said document set during said non-copying circulation said copying control means causes said copier to make multiple copies of said two document sheets in the first copying circulation.

9. The document handling apparatus of claim 1, wherein in response to the determination by said odd/even determining means that there is an odd number of original document sheets, said copying control means causes the single copying of only the next-to-last and subsequent alternate document sheets on the first copying circulation of said document set, and causes the single copying of only the last and alternate subsequent document sheets on the last copying circulation of said document set, and causes the copying of all said document sheets on all copying circulations of said document set between said first and last circulations thereof, wherein said set of original document sheets is a collated face-up stack of 1 to N page order simplex documents which are individually circulated from the bottom of said stack to the platen of said copier and back to the top of said stack in N to 1 order, with N being the page number of the bottom page of said document stack;

wherein said odd/even determining means determines whether N is an odd or even page number, and wherein if N is determined to be an odd number, the document sheets are copied in the first copying circulation as controlled by said copying control means in the copying order sequence N minus 1, N minus 3, N minus 5, etc., up to the total number of document sheets in said document set, and in at least the second copying circulation all the document pages are copied and the Nth document page is first copied on only one side of a copy sheet as a simplex copy, and in the last copying circulation the document sheets are copied in the copying sequence N, N minus 2, N minus 4, etc., wherein if N is determined to be an even number, the documents are copied in the first copying circulation in the order N, N minus 2, N minus 4, etc., and copied on the last copying circulation in the order N minus 1, N minus 3, N minus 5, etc., wherein said copying control means includes duplex buffer means for temporarily storing the copy sheets made of the alternately copied document sheets in said first copying circulation of said document set and for re-presenting all of said temporarily stored copy sheets for the copying of images of alternate document sheets on the opposite sides of all of said stored copy sheet during the subsequent circulation of said document set, and when said odd/even determining means determines that there are an odd number of original documents in said document set, the first copy made in at least the second copying circulation is made from the last document page in the document set onto only one side of a blank copy sheet as a simplex copy sheet, and wherein said odd/even determining means comprises means for circulating the document set in a first single non-copying circulation before any of the documents are copied and counting the number of document sheets which are circulated in said first, non-copying circulation, wherein all of said copies made from said document set have the correct number of copy sheet inversions in their output whether there are an odd or even number of said original documents without an output inverter.

10. A method for recirculatively copying a set of simplex original documents in a copier onto both sides of copy sheets to form pre-collated duplex copy sets comprising the steps of:

circulating the documents in reverse (descending) serial page (N to 1) order beginning with the last sheet (N) in the document set and ending with the first sheet (1) in the document set, automatically determining whether there are an odd or even number of original documents in said document set by counting the documents as they are so circulated before they are copied, copying only the next-to-last (N minus 1) and subsequent alternate documents on the first copying circulation of said document set in said N to 1 order automatically in response to said determination that there are an odd number of original documents in said set, or alternately automatically copying only the last (N) and alternate subsequent documents on the first copying circulation of said document set in said N to 1 order in response to said determination that there are an even number of said original documents in said set, and copying all of said documents in said N to 1 order in all intermediate copying circulations of said document set, and on the last copying circulation, copying the alternate documents not copied on the first copying circulation, to provide properly collated output duplex copy sets with consistent copy sheet output inversion.

11. The method of claim 10, wherein regardless of whether there are an odd or even number of original documents, the odd document pages are copied onto the front sides of the copy sheets so that pre-printed or pre-punched copy sheets may be consistently loaded into the copier in either case.

12. In the method of recirculatively copying a set of original documents in a copier onto both sides of copy sheets to form pre-collated duplex copy sets, including circulating the document set in reverse (descending) (N to 1) serial page order beginning with the last sheet (N) in the document set and ending with the first sheet (1) in the document set, the improvement comprising the steps of:

automatically determining whether there are an odd or an even number of simplex original documents in said document set by counting the simplex documents as they are so circulated before they are copied, in the first copying circulation of the document set, copying in said N to 1 order only the last (Nth) and subsequent alternate simplex documents or alternatively only copying the next-to-last (N minus 1) and subsequent alternate simplex documents automatically in response to said determining of whether there are an odd or even number of simplex documents in said set, and in all intermediate copying circulations of the document set, copying all of said simplex documents in said N to 1 order, and in the last copying circulation of the document set, copying the alternate simplex documents not copied on said first copying circulation, to provide a properly collated output of duplex copy sets having consistent copy sheet output inversion.

* * * * *